Patented June 9, 1925.

1,541,226

UNITED STATES PATENT OFFICE.

HARRY CLIFFORD KARNS, OF PHILADELPHIA, PENNSYLVANIA, ASSIGNOR, BY MESNE ASSIGNMENTS, TO THE KOPPERS COMPANY, OF PITTSBURGH, PENNSYLVANIA, A CORPORATION OF PENNSYLVANIA.

COUMARONE-INDENE RESINS AND PROCESS OF MAKING THE SAME.

No Drawing. Application filed August 10, 1917. Serial No. 185,453.

*To all whom it may concern:*

Be it known that I, HARRY CLIFFORD KARNS, of Philadelphia, in the county of Philadelphia and in the State of Pennsylvania, have invented a certain new and useful Improvement in Coumarone-Indene Resins and Processes of Making the Same, and do hereby declare that the following is a full, clear, and exact description thereof.

My invention relates particularly to a process designed for obtaining resinous substances of an advantageous character and the product thereof.

The object of my invention is to provide a process and the product thereof, in which aromatic oils, especially those obtained as by-products in the destructive distillation of coal, such as crude solvent naphtha, may be treated to obtain resinous substances of an advantageous character.

The object of my invention is particularly to obtain such resinous substances having a lighter color and a greater degree of hardness and transparency than substances of a similar nature previously produced.

Heretofore resinous substances of a similar nature have been produced which have a dark color, a semi-transparent appearance and show a tendency to soften at slightly elevated temperatures. Many of the resins having undesirable characteristics mentioned above are obtained by the polymerization of coal tar distillation oils with sulphuric acid and such resins often show substantial percentages of phenols when destructively distilled. Oils polymerized with sulphuric acid very frequently contain sulphur gases or organic salts of sulphur. Further, these resins are not well adapted for making varnishes since films made thereof turn milky when submerged in water.

Another object of my invention is to provide a process and a product thereof in which tar oils may be polymerized to obtain resinous substances that will overcome the objectionable features above referred to.

While my invention is capable of being carried out in many different ways, for the purpose of illustration I shall described only one way of carrying out my invention hereinafter.

For example, I may proceed as follows: I employ a quantity of aromatic oils, as for example the oils obtained as by-products in the destructive distillation of coal and containing hydrocarbons of the benzene series, and particularly the naphtha distillate consisting of solvent and heavy naphtha which distils over, mainly between 140° and 200° C. The naphtha distillate is heated to a moderately elevated temperature, as for example 45° C. and an amount of aluminum chloride is added, from 0.25% to 1.25% of the weight of the oil, while the whole is being agitated. When the polymerization is complete, as indicated by the fall of the temperature after the rapid rise thereof due to the heat of the reaction, the aluminum chloride is washed out with water, the product is neutralized by the addition of a suitable alkaline reagent, such for example as sodium hydroxide, and the excess of alkali is removed by treatment with hot water. The resinous compound is then obtained by distilling off from it the unpolymerized oil.

If desired, the above process may be modified so as to obtain a resin still lighter in color by treating the oil prior to the addition of aluminum chloride with a small amount of sulphuric acid, preferably in amounts of from 0.1% to 1.0% of the weight of the oil. The oil is then distilled and the distillate washed with water, after which the aluminum chloride is added and the process continued in the manner above described. The treatment of the oil with sulfuric acid as outlined above does not polymerize the coumarone or indene substances of the oil, and in fact this is carefully guarded against. The function of the sulfuric acid is to remove the liquid unsaturated dark-resin-forming hydrocarbons in the oil by decomposition or polymerization. The decomposed or polymerized unsaturated hydrocarbons are left as a black residue in the still after distillation. This residue is undesirable, and is therefore discarded.

A still further improvement in the color can be obtained by applying vacuum distillation in the final removal of the unpolymerized oil.

The product thus obtained is a coumarone resin of the coumarone and indene groups and has the following characteristics: acid number of 0.25 to 0.40, saponification number 40 to 6.0, iodine number 5.0% to 25% iodine per gram resin, ash content .05%–.50% per gram resin, melting point 90° C. to 100° C., clear amber yellow color, freedom of characteristic odor, freedom of phenols, freedom from sulphur gases and organic salts of sulphur. Destructive distillation of the resin yields no sulphur dioxide and the distillation yields 87% to 90% by weight as distillate and 10% to 13% by weight as residue at temperatures from 225° C. to 365° C. A varnish made from the resin will give a surface film which does not turn milky when submerged in water.

It will be noted that the acid and saponification numbers of the improved resin are very low which indicates a high acid and alkaline resisting quality. The iodine number is very low and indicates a low percentage of unsaturated hydrocarbons which makes possible a transparent resin and gives increased atmospheric resistance to the resin. The melting point of the resin is exceedingly high which insures an excellent drying quality, hardness and permanency and particularly adapts the resin for varnish manufacture. By maintaining the improved resin free from sulphur dioxide and ash the transparency of the resin is insured and its resistance to alkalies, acids and atmospheric conditions are greatly improved. The high percentage of distillates recovered by distillation of the improved resin is a criterion of the stability of the constituents composing the resin. The high percentage of distillate obtained from the resin also indicates the low percentage of free carbon therein.

The light colored resin, produced by the above described process wherein the distillate of solvent naphtha is given a preliminary treatment with sulfuric acid, consists of practically pure paracoumarone and its homologues, $(C_{8+n}H_{6+2n})_x$ and para-indene $(C_9H_8)_x$, the sulfuric acid treatment serving to remove polymerized dicyclopentadiene $(C_5H_6)_x$, and polymerized styrolene $(C_8H_8)_x$.

While in the preferred process of obtaining the lightest colored resin by preliminarily polymerizing the dark resin-forming bodies and removing them preferably by distillation prior to the polymerization of the coumarone and indene compounds, sulphuric acid and aluminum chloride, respectively, are preferably employed as the polymerizing agents, other specific polymerizing agents might be employed or the sulphuric acid or aluminum chloride be employed in both polymerizing reactions.

While I have described my invention above in detail, I wish it to be understood that many changes may be made therein without departing from the spirit thereof.

I claim:

1. A process which comprises producing a resinous material from an aromatic oil by decomposing unsaturated hydrocarbons thereof with sulphuric acid, distilling, and treating the distillate therefrom with aluminum chloride.

2. A process which comprises producing a resinous material from an aromatic oil by decomposing unsaturated hydrocarbons thereof with sulphuric acid, distilling, polymerizing the distillate therefrom with aluminum chloride, and distilling the polymerized product to remove unpolymerized oil.

3. A process which comprises producing a resinous material from an aromatic oil by decomposing unsaturated hydrocarbons thereof with sulphuric acid, distilling, polymerizing the distillate therefrom with aluminum chloride, and distilling the polymerized product under a vacuum to remove unpolymerized oil.

4. A process which comprises producing a resinous material from an aromatic oil by polymerizing the oil with aluminum chloride, removal of the aluminum chloride by washing, neutralization of the product with an alkali, removal of the excess alkali by washing, and removal of the unpolymerized oil by distillation.

5. A process which comprises producing a resinous material from an aromatic oil by decomposing the unsaturated hydrocarbons thereof with concentrated sulfuric acid in an amount not sufficient to polymerize the oil, distilling, polymerizing the resin-forming substances in the distillate with aluminum chloride, removing the aluminum chloride by washing, neutralizing the product with an alkali, removing the excess alkali by washing, and removing unpolymerized oil by distillation.

6. A process of producing a resinous material which comprises treating, with 0.1% of its weight of sulfuric acid, a naphtha distillate of coal tar containing oils distilling up to approximately 200° C. to convert unsaturated hydrocarbons into substances readily separable from the oil by distillation, distilling the treated oil and subjecting the distillate to the action of aluminum chloride to polymerize resin-forming constituents of said distillate.

7. A process which comprises producing a resinous material from a naphtha distillate containing oils distilling up to approximately 200° C., by decomposing unsaturated hydrocarbons thereof with sulphuric acid, distilling and treating the distillate therefrom with aluminum chloride.

8. A process of producing a resinous material which comprises treating, with 0.1% to 1.0% of its weight of sulfuric acid, a naphtha distillate of coal tar containing oils distilling up to approximately 200° C., to convert unsaturated hydrocarbons into substances readily separable from the oil by distillation, distilling the treated oil and subjecting the distillate to the action of aluminum chloride in an amount of from 0.25% to 1.25% of the weight of the distillate to polymerize resin-forming constituents of said distillate.

9. A process which comprises eliminating at least a substantial proportion of the unsaturated hydrocarbons contained in a naphtha distillate of coal-tar containing oils distilling up to approximately 200° C., and subjecting the distillate, from which unsaturated hydrocarbons have been eliminated, to the action of aluminum chloride.

10. A process which comprises eliminating at least a substantial proportion of the unsaturated hydrocarbons contained in a naphtha distillate of coal-tar containing oils distilling up to approximately 200° C., subjecting the distillate, from which unsaturated hydrocarbons have been eliminated, to the action of aluminum chloride to polymerize resin-forming constituents and separating the resinous product from the unpolymerized oil.

11. In the process of producing resin from a liquid containing not only compounds of the coumarone-indene group but also compounds capable of forming dark resinous bodies when subjected to the action of sulfuric acid, the steps which comprise treating the liquid with sulfuric acid of sufficient strength to polymerize said dark-resin-forming compounds without appreciable polymerization of the contained coumarone-indene compounds, and then separating the latter from the resulting dark resinous bodies by distillation.

12. In the process of producing resin from a naphtha distillate of coal tar containing not only compounds of the coumarone-indene group but also compounds capable of forming dark resinous bodies when subjected to the action of sulfuric acid, the steps which comprise treating said distillate with sulfuric acid of sufficient strength to polymerize said dark-resin-forming compounds without appreciable polymerization of the contained coumarone-indene compounds, and then separating the latter from the resulting dark resinous bodies by distillation.

13. That step in the process of producing resin from a liquid containing compounds of the coumarone-indene group, which consists in initially treating the mixture with sulfuric acid of sufficient strength to polymerize dark resin-forming bodies without appreciable polymerization of the contained coumarone-indene compounds, and separating the thus polymerized dark resin-forming bodies from the unpolymerized coumarone indene compounds.

14. That step in the operation of producing resin from crude solvent naphtha, which consists in initially treating the crude solvent naphtha with sulfuric acid of sufficient strength to polymerize the contained dark resin-forming bodies without appreciably polymerizing the contained light resin-forming compounds, and separating the thus polymerized dark resin-forming bodies from the naphtha containing the unpolymerized light resin-forming compounds.

15. As a new article of manufacture, a light colored resin consisting of practically pure paracoumarone and its homologues, $(C_{8+n}H_{8+2n}O)_x$ and para indene $(C_9H_8)_x$, being practically free from polymerized dicyclopentadiene $(C_5H_6)_x$, and polymerized styrolene $(C_8H_8)_x$.

16. A process which comprises producing a resinous material from an aromatic oil by decomposing unsaturated hydrocarbons thereof with sulphuric acid, distilling, and treating the distillate therefrom with aluminum chloride in an amount of from 0.25% to 1.25% of the weight of the oil.

17. A resinous polymerization product of the coumarone group having an acid number less than 0.5, a saponification number less than 7.0, an iodine number less than 26%, the melting point higher than 85° C., and characterized by its products of destructive distillation being free from phenols, sulphur dioxide and organic sulphur salts.

18. A clear amber yellow coumarone resin which upon destructive distillation yields greater than 85% by weight of distillates, and further characterized by the fact that films thereof will not turn milky when submerged in water.

19. Those steps in the process of producing a light colored resin from oils containing compounds of the coumarone-indene group together with dark resin-forming bodies, which consist in so treating the oil with sulphuric acid as to polymerize the dark resin-forming bodies without substantial polymerization of the light resin-forming coumarone-indene compounds, and separating the polymerized dark resin-forming bodies from the oil containing the unpolymerized light resin-forming compounds.

20. Those steps in the process of producing a light colored resin from oils containing compounds of the coumarone-indene group together with dark resin-forming bodies, which consist in so treating the oil with sulphuric acid as to polymerize the dark resin-forming bodies without substantial polymerization of the light resin-forming coumarone-indene compounds, and distilling the oil so as to separate the polymerized dark resin-forming bodies from the oil containing the unpolymerized light resin-forming compounds.

21. Those steps in the process of producing a light colored resin from oils containing compounds of the coumarone-indene group together with dark resin-forming bodies, which consist in polymerizing the dark resin-forming bodies without substantial polymerization of the light resin-forming coumarone-indene compounds, and separating the polymerized dark resin-forming bodies from the oil containing the unpolymerized light resin-forming compounds.

22. Those steps in the process of producing a light colored resin from oils containing compounds of the coumarone-indene group together with dark resin-forming bodies, which consist in polymerizing the dark resin-forming bodies without substantial polymerization of the light resin-forming coumarone-indene compounds, and distilling the oil so as to separate the polymerized dark resin-forming bodies from the oil containing the unpolymerized light resin-forming compounds.

23. Those steps in the process of producing a light colored resin from oils containing compounds of the coumarone-indene group together with dark resin-forming bodies, which consist in converting into separable form the dark resin-forming bodies which would would otherwise impart a dark color to the resin, separating such bodies from the oil, and thereafter polymerizing the light resin-forming coumarone-indene compounds.

24. Those steps in the process of producing a light colored resin from oils containing compounds of the coumarone-indene group together with dark resin-forming bodies, which consist in converting into separable form the dark resin-forming bodies which would otherwise impart a dark color to the resin, and separating such bodies from the oil.

25. Those steps in the process of producing a light colored resin from oils containing compounds of the coumarone-indene group together with bodies which would impart a dark color to the resin, which consist in converting into separable form the bodies which would otherwise impart the dark color to the resin, separating such bodies from the oil by distillation, and thereafter subjecting the distillate to a polymerizing treatment to polymerize the light resin-forming coumarone-indene compounds.

26. Those steps in the process of producing a light colored resin from oils containing compounds of the coumarone-indene group together with bodies which would otherwise impart a dark color to the resin, which consist in removing such bodies from the oil by treatment with sulphuric acid followed by distillation, and thereafter polymerizing the light resin-forming coumarone-indene compounds.

In testimony that I claim the foregoing I have hereunto set my hand.

HARRY CLIFFORD KARNS.

Witnesses:
GILBERT C. CLARK,
W. G. LODGE.

oil containing the unpolymerized light resin-forming compounds.

21. Those steps in the process of producing a light colored resin from oils containing compounds of the coumarone-indene group together with dark resin-forming bodies, which consist in polymerizing the dark resin-forming bodies without substantial polymerization of the light resin-forming coumarone-indene compounds, and separating the polymerized dark resin-forming bodies from the oil containing the unpolymerized light resin-forming compounds.

22. Those steps in the process of producing a light colored resin from oils containing compounds of the coumarone-indene group together with dark resin-forming bodies, which consist in polymerizing the dark resin-forming bodies without substantial polymerization of the light resin-forming coumarone-indene compounds, and distilling the oil so as to separate the polymerized dark resin-forming bodies from the oil containing the unpolymerized light resin-forming compounds.

23. Those steps in the process of producing a light colored resin from oils containing compounds of the coumarone-indene group together with dark resin-forming bodies, which consist in converting into separable form the dark resin-forming bodies which would would otherwise impart a dark color to the resin, separating such bodies from the oil, and thereafter polymerizing the light resin-forming coumarone-indene compounds.

24. Those steps in the process of producing a light colored resin from oils containing compounds of the coumarone-indene group together with dark resin-forming bodies, which consist in converting into separable form the dark resin-forming bodies which would otherwise impart a dark color to the resin, and separating such bodies from the oil.

25. Those steps in the process of producing a light colored resin from oils containing compounds of the coumarone-indene group together with bodies which would impart a dark color to the resin, which consist in converting into separable form the bodies which would otherwise impart the dark color to the resin, separating such bodies from the oil by distillation, and thereafter subjecting the distillate to a polymerizing treatment to polymerize the light resin-forming coumarone-indene compounds.

26. Those steps in the process of producing a light colored resin from oils containing compounds of the coumarone-indene group together with bodies which would otherwise impart a dark color to the resin, which consist in removing such bodies from the oil by treatment with sulphuric acid followed by distillation, and thereafter polymerizing the light resin-forming coumarone-indene compounds.

In testimony that I claim the foregoing I have hereunto set my hand.

HARRY CLIFFORD KARNS.

Witnesses:
GILBERT C. CLARK,
W. G. LODGE.

Certificate of Correction.

It is hereby certified that in Letters Patent No. 1,541,226, granted June 9, 1925, upon the application of Harry Clifford Karns, of Philadelphia, Pennsylvania, for an improvement in "Coumarone-Indene Resins and Processes of Making the Same," an error appears in the printed specification requiring correction as follows: Page 2, line 48, strike out the formula and insert instead $(C_{8+n}H_{6+2n}O)_x$; and that the said Letters Patent should be read with this correction therein that the same may conform to the record of the case in the Patent Office.

Signed and sealed this 21st day of July, A. D. 1925.

[SEAL.]

KARL FENNING,
Acting Commissioner of Patents.

Certificate of Correction.

It is hereby certified that in Letters Patent No. 1,541,226, granted June 9, 1925, upon the application of Harry Clifford Karns, of Philadelphia, Pennsylvania, for an improvement in "Coumarone-Indene Resins and Processes of Making the Same," an error appears in the printed specification requiring correction as follows: Page 2, line 48, strike out the formula and insert instead $(C_{8+n}H_{6+2n}O)_x$; and that the said Letters Patent should be read with this correction therein that the same may conform to the record of the case in the Patent Office.

Signed and sealed this 21st day of July, A. D. 1925.

[SEAL.]                          KARL FENNING,
*Acting Commissioner of Patents.*